C. E. WHITE.
HARROW.
APPLICATION FILED MAY 29, 1908.
1,134,654.
Patented Apr. 6, 1915.
2 SHEETS—SHEET 2.
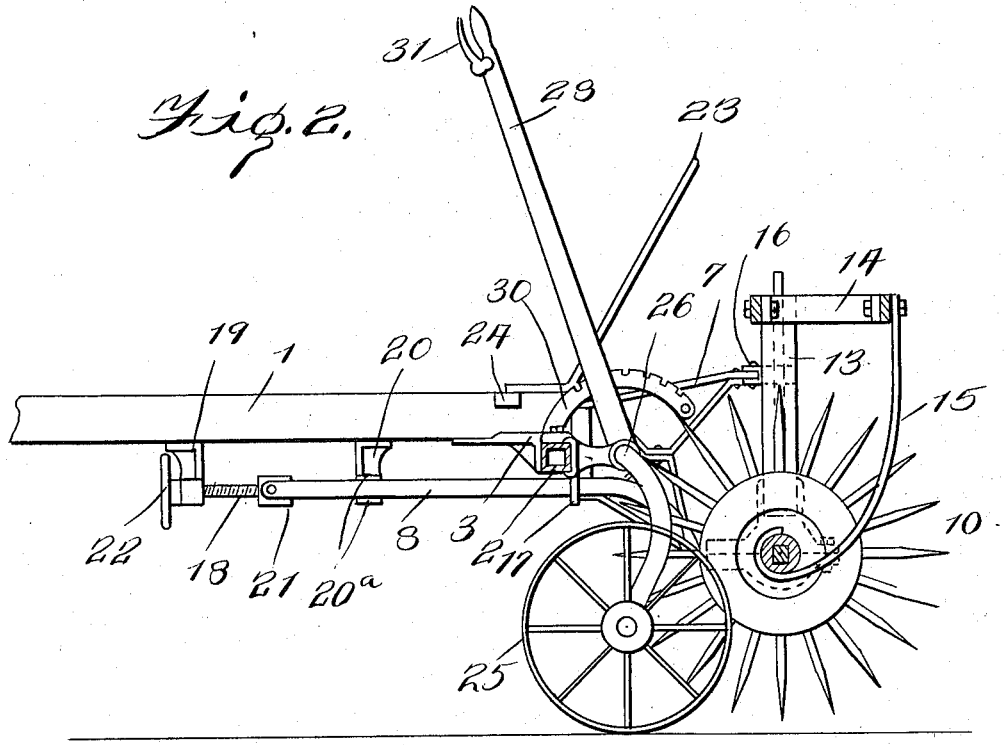
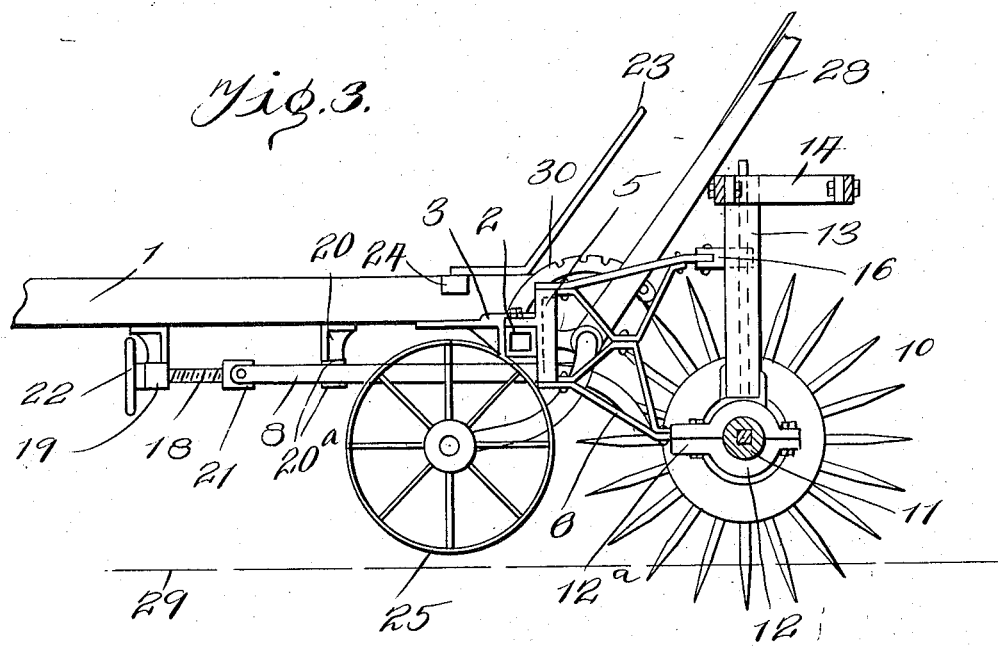
Witnesses
B. G. Brann
A. G. Russell.
Inventor
Charles E. White
By H. H. Bliss
Attorney

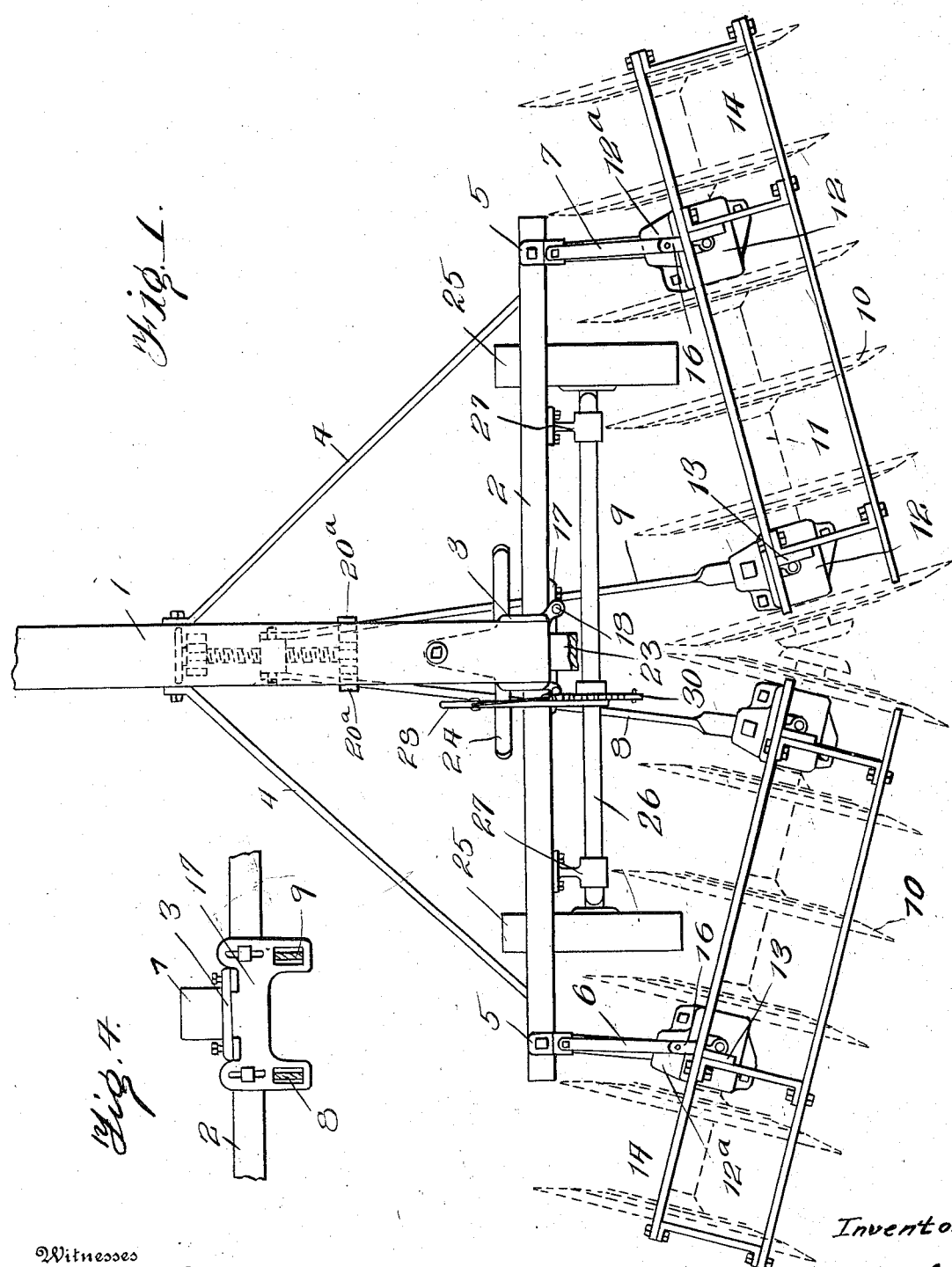

UNITED STATES PATENT OFFICE.

CHARLES E. WHITE, OF MOLINE, ILLINOIS, ASSIGNOR TO DEERE & MANSUR COMPANY, A CORPORATION OF ILLINOIS.

HARROW.

1,134,654.  Specification of Letters Patent.  Patented Apr. 6, 1915.

Application filed May 29, 1908. Serial No. 435,831.

*To all whom it may concern:*

Be it known that I, CHARLES E. WHITE, a citizen of the United States, residing at Moline, in the county of Rock Island and State of Illinois, have invented certain new and useful Improvements in Harrows, of which the following is a specification, reference being had therein to the accompanying drawing.

The invention relates more particularly to harrows which are adapted for the renovation of alfalfa, or other crops of a similar character. In implements of this kind use is made of disks with radially extending spike teeth. These toothed disks or heads are arranged in gangs and roll over the ground in much the same manner as do the disks of the ordinary disk harrow, although their action is quite different. As commonly constructed heretofore, the frame work of these implements has been quite similar to that of the well known disk harrow having two gang frames pivotally connected to the draft bars and provided with means to effect their angular adjustment in relation to the lines of draft. This construction is adapted to the requirements of the implement in many respects, but difficulty is met in transporting the implement, that is, in moving it over roads, bridges, etc., by reason of the character of the toothed heads. Also, there is no adequate means for regulating the penetration of the teeth, reliance having been placed on the weighting of the implement with rocks, or the like, to increase the penetration. In the present invention these difficulties are overcome by providing the implement frame with suitable ground wheels adapted to be lowered and raised to correspondingly raise and lower the frame. This, as well as other features of the construction, will be understood from the following description in connection with the drawings which illustrate one form of the invention.

In the drawings, Figure 1 is a plan view of the harrow. Fig. 2 is an elevation of the harrow, partly in section. Fig. 3 is an end elevation of the harrow, showing the wheels raised and the frame and disk lowered relative to the ground. Fig. 4 is a fragmentary view showing in rear elevation one of the vertically adjustable guide plates for the draft bars.

The main frame of the implement comprises the pole or tongue 1, and the tubular transverse bar or beam 2 rigidly secured to the rear end of the tongue by means of an angle casting 3.

4—4 are diagonal braces extending from the outer ends of the beam 2 to the tongue. At each end the beam 2 is provided with castings 5 to which are secured the rearwardly extending trussed frames 6 and 7, the latter together with the draft bars 8 and 9 which are adjustably connected to the under side of the tongue, serving to connect the two tool gangs to the main frame.

Each gang of tools comprises a plurality of toothed disks or heads 10 and interposed spacing spools 11, the said heads and spools being mounted upon a gang bolt in the well known manner in which disk harrows are constructed. Two of the spacing spools of each gang are fitted to receive bearing boxes 12 and to the two bearing boxes of each gang is secured a gang frame comprising the upright bars 13 and the rectangular frame 14, which is secured to the upper ends of said bars 13. Each head is preferably provided with a scraper bar 15 secured at its upper end to the frame 14, and at its lower end to a spacing spool, as shown in Fig. 2.

The frames 6 and 7 are pivotally connected at their rear ends to the forwardly extending parts 12ª of the outside bearing boxes and to the castings 16 carried by the upright bars 13. The draft bars 8 and 9 are similarly connected to the inside bearing boxes of the two gangs. These bars extend forward through slots in the depending plate 17 (see Fig. 4) which are bolted to the beam 2, the plates having elongated bolt holes to permit their vertical adjustment.

The front ends of the draft bars 8 and 9, as previously stated, are adjustably connected to the tongue. The adjustment of these bars is affected by means of the screw 18, which is rotatably mounted in depending brackets 19 and 20. The screw carries a nut or threaded block 21 to which the draft bars 8 and 9 are pivoted. The screw also carries a hand-wheel 22 by which it may easily be turned to move the block 21 forward or backward to change the angular relation of the gangs to the lines of draft, the proper adjustment of the gangs being determined by the character of the ground, greater angularity of the gangs being suitable for dry ground. The bracket 20 preferably has a pair of lugs 20ª formed on either side to receive and brace the bars 8 and 9.

23 indicates a seat standard, the seat itself being broken away, and 24, foot rests for the driver.

Heretofore, in implements of this class a weight box has been provided in connection with the upper part of the gang frame, and by weighting the gangs more or less the desired penetration of the teeth was secured. It is desirable that the operator should have means for readily and conveniently controlling the depth of penetration and for the purpose of providing this and at the same time enabling the operator to raise the frame of the implement so that the toothed heads will clear the ground to facilitate transportation of the implement, I provide the ground wheels 25 which are mounted upon the arched shaft or axle 26. This shaft is rotatably mounted in brackets 27 secured to the rear face of the beam 2 and near its middle is provided with a rigidly secured hand-lever 28.

It will be seen that by swinging the hand-lever, the wheels 25 may be raised or lowered. In Fig. 3 the hand-lever is shown thrown back so as to raise the wheels 25 clear of the ground to permit the maximum penetration of the teeth, the ground line being indicated at 29. If a less penetration is desired the hand-lever is thrown forward bringing the wheels 25 in contact with the ground and the forward pressure upon the hand-lever in connection with the draft of the team, which latter tends to drag the wheels 25 backward with respect to the frame, causes the lifting of the frame to the desired position where it may be held by the hand-lever lock which comprises a toothed segment 30 secured to the main frame and the coöperating thumb latch 31 with which the lever is provided.

In transporting the implement to and from the places of use, the hand-lever 28 is thrown forward, bringing the wheels 25 back to the position shown in Fig. 2, and raising the frame of the implement sufficient to cause the toothed heads to clear the ground. With the implement thus raised, it will be seen that it can be readily transported wherever desired without tearing up the ground and without the risk of catching and breaking the teeth in passing over bridges or the like. In short the wheel construction which I provide makes the implement as easily transported as the ordinary wheeled implement, and at the same time constitutes effective means for controlling the penetration of the teeth when the implement is in operation.

As there is not need in an implement of this class of frequent or extensive angular adjustment of the gangs, I consider the screw adjustment which is compact and out of the way superior to the hand-lever adjustment which has previously been employed.

The ground wheels and their cranked axle are arranged so that their axes are in front of the axes of the gangs. The ground wheels, as above remarked, can be used either for regulating the depth of penetration of the teeth in soft soil, or used as a means of support for both the frame and the gangs when the latter are out of operation.

I am aware of the fact that harrow implements have been heretofore made with elongated frames carrying hoe teeth, four wheels being required for supporting them, two at the front end and two at the rear, and that some of these wheels have been utilized for lifting and lowering the teeth. But I believe myself to be the first to have provided a harrow implement of the class of the present machine having two forward and backward adjustable tool gangs situated at a distance beyond the rear end of the draft frame, with two supporting and depth-adjusting wheels so arranged that they can carry substantially all of the weight of the frame and the gangs when situated in either of several positions longitudinally of the machine; they thus being available either for supporting the teeth when working at one or another of several depths or for supporting the frame and the gangs, when the latter are entirely out of the ground.

Having thus described my invention, what I claim and desire to secure by Letters Patent, is:—

1. In an implement of the class set forth, the combination of a main frame, comprising a pole or tongue, a transverse beam secured to the rear end thereof and rearward extending vertically non-yieldable frame parts carried by the beam, one on each side of the pole, two gangs of toothed heads, each pivotally connected to one of said rearward extending frame parts, draft bars adjustably connected at their front ends to the main frame and connected at their rear ends to the inner ends of the respective tool gangs, means on the main frame for holding the draft bars against upward and downward movement, ground wheels mounted adjustably on the main frame, on an axis in front of the axes of the gangs, means for raising and lowering said wheels and means for holding them in either of several positions vertically whereby they can sustain the teeth either at differing working positions or hold them entirely above the ground, the axis of said wheels being movable longitudinally of the machine from one working position to another.

2. In an implement of the class set forth, the combination of a main frame comprising a pole or tongue, a transverse beam secured to the end thereof, rearward extending vertically non-yieldable frame parts carried by the beam, one on each side of the pole, two gangs of toothed heads, each connected to one of said rearward extending frame parts, draft bars adjustably connected at their front ends to the main frame and connected at their rear ends to the inner ends of the respective gangs, means on the main frame for holding the draft bars against upward and downward movement, an arched axle rotatably mounted on the transverse beam, an adjustable lock for the axle, ground wheels mounted on said axle, and adapted to be held by said lock in either of several working positions longitudinally of the machine, and means for turning the axle to swing the wheels downward or upward to raise or lower the frame, said axle and wheels being situated in front of the gangs and arranged to carry in either of several working positions substantially all of the weight of the frame and the gangs.

3. In an implement of the class set forth, the combination of the main frame comprising a pole and transverse bar or beam secured to the rear end thereof, the two gangs of toothed disks, each pivotally connected to the transverse bar or beam, the two draft bars each connected at its rear end to the inner end of one of the gangs, and means for adjustably connecting the front ends of said draft bars to the pole comprising a screw rotatably mounted beneath the pole and held against endwise movement, a nut on the screw to which the draft bars are directly secured and lugs 20ª receiving and bracing the said draft bars.

4. In a harrow of the class described, the combination of a main frame having a relatively elevated pole and a transverse bar or beam at the rear end thereof, the two gangs with toothed disks having their axes in relatively low planes and each having pivotal connection with the aforesaid transverse bar or beam, the drag bars 8, 9 each pivotally connected to the inner end of a gang and having the elongated forward part arranged to lie in horizontal planes between the gang axes and the tongue, guides or supports extending downward from the tongue for the said bars holding them against vertical movement but permitting longitudinal movement therein, the nut 21 pivotally connected to the said guide bars and the bodily stationary screw 18 underneath the pole engaging with the said nut.

In testimony whereof I affix my signature, in presence of two witnesses.

CHARLES E. WHITE.

Witnesses:
N. A. PETERSON,
J. V. LOCKHART.